United States Patent
Nijkamp et al.

(10) Patent No.: US 11,294,118 B2
(45) Date of Patent: Apr. 5, 2022

(54) LIGHT GUIDE-BASED LUMINAIRE

(71) Applicant: SIGNIFY HOLDING B.V., Eindhoven (NL)

(72) Inventors: Rick Gerhardus Nijkamp, Eindhoven (NL); Hendrik Jan Kettelarij, Eindhoven (NL); Vincent Stefan David Gielen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 296 days.

(21) Appl. No.: 16/624,774

(22) PCT Filed: Jun. 8, 2018

(86) PCT No.: PCT/EP2018/065165
§ 371 (c)(1),
(2) Date: Dec. 19, 2019

(87) PCT Pub. No.: WO2018/234065
PCT Pub. Date: Dec. 27, 2018

(65) Prior Publication Data
US 2021/0141149 A1    May 13, 2021

(30) Foreign Application Priority Data

Jun. 20, 2017  (EP) .................................... 17176857

(51) Int. Cl.
*F21V 8/00*  (2006.01)
*H04B 10/50*  (2013.01)
*H04B 10/60*  (2013.01)

(52) U.S. Cl.
CPC ......... *G02B 6/0088* (2013.01); *G02B 6/0051* (2013.01); *G02B 6/0055* (2013.01);
(Continued)

(58) Field of Classification Search
CPC .. G02B 6/0088; G02B 6/0051; G02B 6/0055; G02B 6/0065
See application file for complete search history.

(56) References Cited

U.S. PATENT DOCUMENTS

| | | |
|---|---|---|
| 2005/0219860 A1 | 10/2005 | Schexnaider |
| 2012/0176784 A1 | 7/2012 | Peifer et al. |
| 2016/0065917 A1 | 3/2016 | Kim et al. |

FOREIGN PATENT DOCUMENTS

| | | |
|---|---|---|
| CN | 105065990 A | 11/2015 |
| DE | 202014103632 U1 | 9/2014 |

(Continued)

*Primary Examiner* — Mary Ellen Bowman
(74) *Attorney, Agent, or Firm* — Daniel J. Piotrowski

(57) ABSTRACT

A luminaire is disclosed comprising an optical stack (200) transparent to radio waves, the optical stack comprising a first surface (210) including a light exit window (211) and a further surface (220) opposing the first surface, the optical stack including a planar light guide (300) having a first major surface facing or defining the first surface, an opposing second major surface facing or defining the further surface and at least one edge surface (310) extending between said opposing first and second major surfaces; and a frame (700) around the optical stack, the frame carrying at least one light source (100) optically coupled to one or more of said edge surfaces of the light guide, wherein the frame delimits the light exit window and an exposed portion (221) of the further surface opposing the light exit window, said light exit window and the exposed portion delimiting a conduit (230) for said radio waves through the optical stack.

13 Claims, 5 Drawing Sheets

(52) U.S. Cl.
CPC ............ *G02B 6/0065* (2013.01); *H04B 10/50* (2013.01); *H04B 10/60* (2013.01)

(56) References Cited

FOREIGN PATENT DOCUMENTS

| | | |
|---|---|---|
| EP | 2924354 A1 | 9/2015 |
| WO | 2012158894 A2 | 11/2012 |

LIGHT GUIDE-BASED LUMINAIRE

CROSS-REFERENCE TO PRIOR APPLICATIONS

This application is the U.S. National Phase application under 35 U.S.C. § 371 of International Application No. PCT/EP2018/065165, filed on Jun. 8, 2018, which claims the benefit of European Patent Application No. 17176857.5, filed on Jun. 20, 2017. These applications are hereby incorporated by reference herein.

FIELD OF THE INVENTION

The present invention relates to a luminaire comprising an optical stack having a light exit surface and a further surface opposing the light exit surface, the optical stack comprising a planar light guide having a first major surface facing or defining the light exit surface, an opposing second major surface facing or defining the further surface and a plurality of edge surfaces extending between said opposing first and second major surfaces.

BACKGROUND OF THE INVENTION

With the advent of solid state lighting (SSL), e.g. LEDs, light guide-based luminaires have become increasingly commonplace. The light guide may be a planar structure that receives light from one or more light sources, e.g. SSL elements and spreads this light across its output surface such that the light output of such a light guide is more distributed than its input, e.g. by an array of optical elements such as micro-lenses or paint dots on its output surface that cause the light to exit the light guide. In this manner, the produced luminous output is given a more homogenous appearance than produced by the light sources, e.g. point light sources such as SSL elements, which improves the aesthetic appeal of a luminaire including such a light source and can help reduce unwanted side effects such as glare, which for instance can occur when the (point) light sources are rather bright.

Light sources such as SSL elements have the further advantage that they can produce a highly configurable luminous output, e.g. in terms of intensity and spectral composition, e.g. colour, which has led to smart lighting systems that can be remotely controlled by its user through wireless control. This for example may be achieved using dedicated remote controllers or through software programs (apps) that are installed in a portable communication device such as a mobile phone or tablet computer. To this end, the luminaire comprises a receiver for receiving such wireless control signals. However, as the light guide typically is mounted in a metal housing that envelopes the light guide apart from the light exit window, such a receiver must be mounted at the front of the luminaire to ensure that the radio frequency wireless control signals can be received, as such metal housings block radio waves. This is not ideal from an aesthetic perspective, as such a receiver may be considered unsightly and disruptive to the aesthetic appearance of the luminaire.

CN 105 065 990 A discloses a LED lamp system which comprises a frame part, a lamp holder and a panel, wherein the frame part is provided with an inner cavity, the lamp holder is detachably arranged in the inner cavity and is provided with a controller and a mounting plate and a plurality of LEDs is fixedly arranged on the mounting plate. However, this arrangement has a number of disadvantages. Firstly, due to the arrangement of the LEDs on the mounting plate, it is more difficult to achieve a homogeneous luminous output with such a lamp system. In addition, as the components such as the driver and the wireless receiver are mounted in the frame, the frame needs to include a mounting space for these components, which increases the form factor of the frame, which is not ideal from an aesthetic perspective. Also, the frame must be transparent to radio waves such that the remotely generated wireless control signals for the luminaire can reach the wireless receiver in the frame, which limits the materials that can be used for the frame.

EP-2924354 discloses a lighting device having a housing with an opening opposite to a back side. The opening of the housing has a frame that is coupled to the opening via a sealing element. Located in the opening of the housing, and behind the frame, is a light-emitting surface means, comprising a light guide plate made of polycarbonate, having a front surface for outcoupling light, and a rear surface that is provided with a reflection assembly and a color assembly. The lighting device has a light emitting unit for emitting light into the light guide plate via two mutually opposing peripheral surfaces thereof. The light emitting unit comprises two LED PCBs, which are equipped with a plurality of light emitting diodes. Disposed on the back side of the housing, directly behind the light-emitting surface means, is a high frequency radar sensor for detecting movement and/or presence of an object in a detection area outside the housing. The lighting device further has a control device for influencing an operating state of the light emitting unit in response to a detection signal of the high frequency radar sensor. Similar as described above, because the high frequency radar sensor is located inside the housing, the latter needs to include a mounting space, which increases the form factor, and which is not ideal from an aesthetic perspective.

SUMMARY OF THE INVENTION

The present invention seeks to provide a luminaire in which at least some of these drawbacks have been addressed.

According to an aspect, there is provided a luminaire comprising an optical stack transparent to radio waves, the optical stack comprising a first surface including a light exit window and a further surface opposing the first surface, the optical stack including a planar light guide having a first major surface facing or defining the first surface, an opposing second major surface facing or defining the further surface and at least one edge surface extending between said opposing first and second major surfaces; and a frame around the optical stack, the frame carrying at least one light source optically coupled to one or more of said edge surfaces of the light guide, wherein the frame delimits the light exit window and an exposed portion of the further surface opposing the light exit window, said light exit window and the exposed portion delimiting a conduit for said radio waves through the optical stack.

In accordance with embodiments of the present invention, a photo frame-style frame is provided around the edge of the optical stack of a luminaire, and in which the optical stack is made of materials that are transparent to radio waves such that at least a central area of the optical stack that is delimited by the frame, i.e. the conduit, is transparent to such radio waves. Consequently, a module including at least one component for generating or receiving said radio waves such as a wireless receiver for receiving control signals of the light source(s) may be placed behind the optical stack, i.e. facing its further surface, as the radio frequency (RF) signals to be received by the wireless receiver can travel through this central region of the optical stack. This improves the appearance of the luminaire as the module no longer needs to be provided in front of the optical stack in order to be able to receive such RF signals, and allows the frame to be slimmer than for example the frame disclosed in CN 105 065 990 A due to the fact that at least the wireless receiver no longer needs to be integrated in the frame. This also allows for the frame to be made of metal, which may be aesthetically preferable, which is problematic in this prior art as such a metal frame can stop the RF signals from reaching the wireless receiver in the frame.

In preferred embodiments, the luminaire further comprises the module including at least one component for generating or receiving the radio waves. Such at least one component may include a wireless receiver for receiving a control signal for the at least one light source. Such a component may include one or more sensors that can receive sensor stimuli through the optical stack as well as one or more drivers for the at least one light source. In addition, the component may include a transmitter, e.g for transmitting control signals to other devices such as other luminaires, with the luminaire of the present invention acting as a controller or as a control signal relay entity for such other devices. The module may be placed behind the luminaire in case of a wall-mounted luminaire or on top of the luminaire in case of a ceiling-mounted luminaire, e.g. a troffer or the like. In case of a wall-mounted luminaire, the frame may be dimensioned such that upon affixing the luminaire to the wall (or another surface), a clearance is formed between the luminaire and its mounting surface in which the module fits, i.e. the module may be dimensioned to fit in said clearance.

The module may be physically separated from the luminaire, e.g. provide control signals to the luminaire in a wireless fashion. Alternatively, the module may be connected to the luminaire by one or more cables only, which cables may connect the module to the at least one light source, in which case the module may be placed against the further surface of the optical stack such that the module is supported by part of the frame in case of a vertically mounted luminaire, i.e. a luminaire mounted such that the optical axis of the optical stack is horizontally aligned, or such that such that the module is supported by part of the further surface of the optical stack in case of a horizontally mounted luminaire, i.e. a luminaire mounted such that the optical axis of the optical stack is vertically aligned. Alternatively, the module may be attached to the further surface, e.g. adhered to the further surface or mounted on the further surface through an arrangement such as a tongue and groove arrangement, with fixing members such as mounting screws, and so on.

The at least one light source preferably comprises a plurality of solid state lighting elements arranged along one or more edge surfaces of the optical stack. The optical stack may further comprise a planar diffuser on the first major surface or the light guide in order to further diffuse the luminous output of the light guide, e.g. to further homogenize the luminous output of the light guide and/or to reduce glare. The optical stack may further comprise a planar reflector on the second major surface or the light guide in order to increase the optical efficiency of the luminaire by reducing light losses through the further surface of the optical stack.

The frame may comprise a plurality of frame elements cooperating to form the frame, at least some of said frame elements comprising an elongate surface facing one of said edge surfaces, wherein at least some of the light sources are mounted on said elongate surface in order to allow light to be coupled into the light guide. For example, the light sources may be solid state elements carried by an adhesive strip adhered to the elongate surface. This is a particularly cost-effective manner of affixing the light sources to such an elongate surface because of the low manufacturing cost of the adhesive strip and the straightforward assembly of the luminaire.

Each frame element may comprise a U-shaped profile in which the optical stack is secured, as this facilitates a straightforward manner of securing the optical stack in the frame elements.

In one example embodiment, the plurality of frame elements includes a first frame element including a groove and a second frame element comprising a tongue dimensioned to be secured in said groove. In this embodiment, the optical stack may be clamped in between the first frame element and the second frame element, in which the two frame elements are secured against each other by fastening the tongue of the second frame element in the groove of the first frame element, e.g. by one or more barbs on the tongue being forced through a resilient ring in the groove or in any other suitable manner. The groove may comprise the elongate surface, i.e. may have a surface facing the edge surface of the light guide onto the at least one light source, e.g. a linear array such as a strip of solid state lighting elements may be positioned.

In another example embodiment, the plurality of frame elements are elongate linear elements having terminal surfaces under a 45° angle with the elongation direction of the elongate linear elements, wherein the terminal surfaces of adjacent elongate linear elements abut each other and the plurality of frame elements are secured against each other with fastening members. In the context of the present invention, a linear element is an element that extends along a single edge of the optical stack. In this embodiment, the frame resembles a typical photo frame in which e.g. four frame elements along the four edges of the object to be framed (here the optical stack) are slotted onto the object and secured to each other with fixing members such as screws.

The various components of the optical stack individually may be made of one or more polymer materials as such polymer materials typically are particularly transparent to radio waves. In contrast, the frame may be made of any suitable material, e.g. may be a metal or polymer frame, as the frame does not need to be transparent to radio waves such that any suitable material to give the luminaire a desired appearance may be used for the frame.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
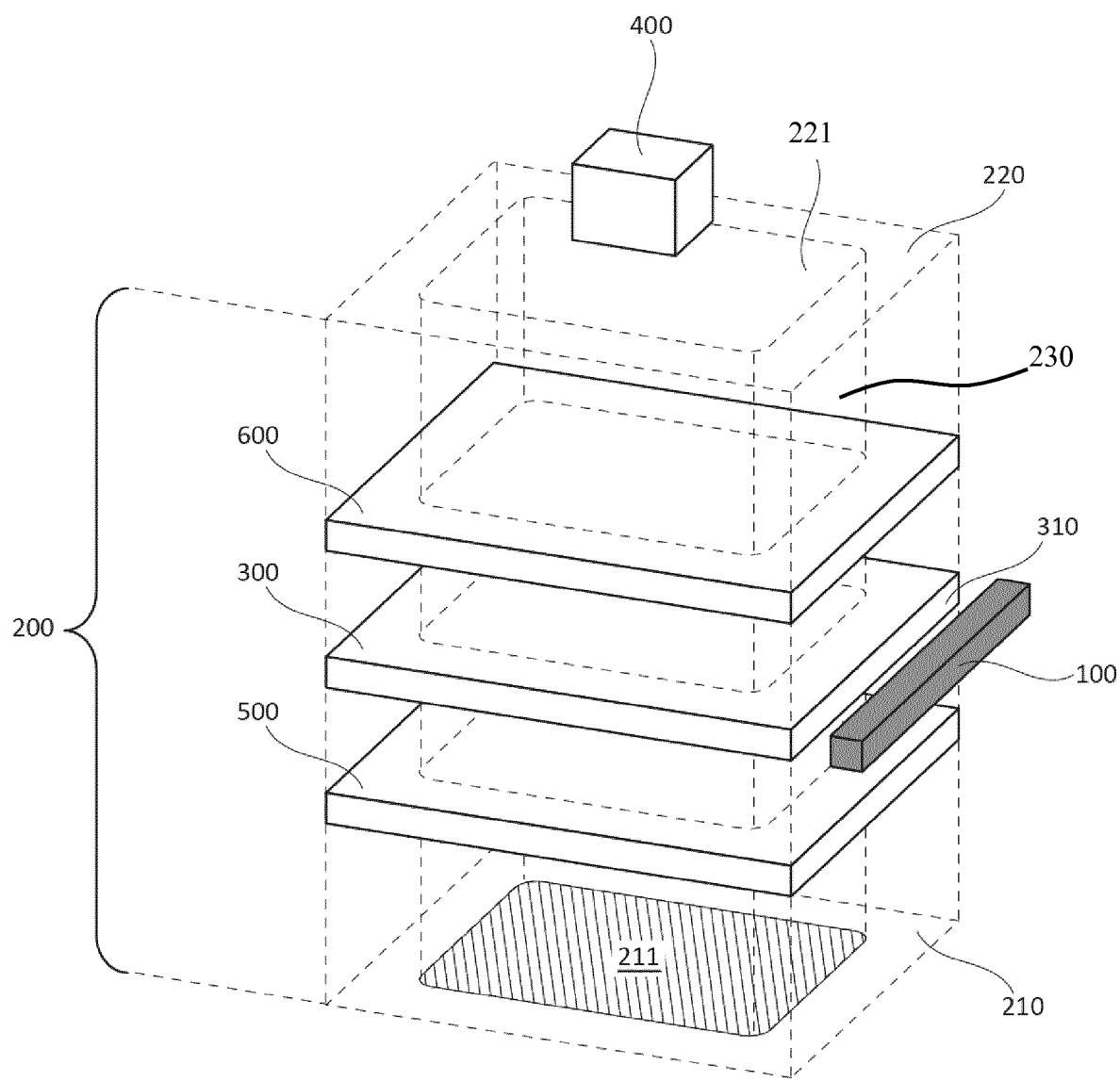
FIG. 1 schematically depicts an exploded view of part of a luminaire according to an embodiment.

It should be understood that the Figures are merely schematic and are not drawn to scale. It should also be understood that the same reference numerals are used throughout the Figures to indicate the same or similar parts.

FIG. 1 schematically depicts an exploded view of part of a luminaire 10 according to embodiments of the present invention. The luminaire 10 comprises an optical stack 200 comprising at least a planar light guide 300 having opposing major surfaces between which one or more edge surfaces 310 extend. For example, in case of a circular light guide 300 the light guide would have a single edge surface 310, whereas in case of a polygonal light guide 300 the light guide would have a plurality of edge surfaces 310 matching the number of sides of the polygon, e.g. four edge surfaces 310 in case of a rectangular light guide 300 as schematically depicted in FIG. 1. It is noted for the avoidance of doubt that embodiments of the present invention are not limited to a particular shape light guide 300 other than that the light guide 300 typically is a planar light guide.

The luminaire 10 further comprises at least one light source 100 arranged along an edge surface 310 of the planar light guide 300, which are light source 100 is arranged to produce a luminous output that is coupled into the light guide 300 through its edge surface 310. In at least some embodiments, the luminaire 10 comprises at least a pair of such light sources 100 arranged along opposing edge surfaces 310 of the planar light guide 300, whilst in yet another set of embodiments each edge surface 310 of the light guide 300 has a light source 100 arranged along it. In a preferred embodiment, the at least one light source comprises a plurality of solid state lighting (SSL) elements, e.g. LEDs, arranged along such an edge surface 310 of the light guide 300 although embodiments of the present invention are not limited to the use of SSL elements as light sources.

The optical stack 200 has a first surface 210 including a light exit surface 211 and a further surface 220, which in case of the optical stack 200 only comprising the light guide 300 are formed by the opposing major surfaces of the light guide 300. However, the optical stack 200 may further comprise a reflector or reflective sheet 600 in between the light guide 300 and the further surface 220 and/or a planar diffuser 500 in between the light guide 300 and the first surface 210 including the light exit window 211.

The reflector or reflective sheet 600 may comprise a reflective coating such as a white paint coating on its major surface facing the light guide 300 such that light coupled into the light guide 300 and attempting to exit the light guide 300 through its major surface facing the further surface 220 is coupled back into the light guide 300 by the reflector or reflective sheet 600, thereby reducing light losses and improving the optical efficiency of the luminaire 10 because a larger proportion of the light generated by the one or more light sources 100 and coupled into the light guide 300 through one or more of its edge surfaces 310 exits the luminaire 10 through its light exit window 211.

The diffuser or diffusive sheet 500 may be included to further diffuse the light that exits the light guide 300 through its major surface facing the light exit window 211, e.g. to prevent or reduce glare experienced by an observer looking directly at the light exit window 211 of the luminaire 10.

As will be explained in further detail below, the optical stack 200 is held in a frame, which in at least some embodiments resembles a photo frame. The frame is not shown in FIG. 1 for the sake of clarity only, although its presence can be seen in FIG. 1 from the light exit window 211 having a smaller area than the first surface 210 as the perimeter of the first surface 210 around the light exit window 211 is typically covered by part of this frame. Similarly, the further surface 220 comprises a central region 221 delimited by an edge of the frame covering the remainder of the further surface 220. The at least one light source 100 typically is integrated in the frame.

In accordance with the present invention, the various components making up the optical stack 200, i.e. the light guide 300 and optionally the diffuser 500 and/or the reflector 600, are made of materials that are (substantially) transparent to radio waves such that the optical stack 200 comprises a conduit 230 for such radio waves through the optical stack 200 having an entry surface in the form of the light exit window 211 and an exit surface in the form of the central region 221 of the further surface 220. For example, the various elements of the optical stack 200 individually may be made of polymers such as polycarbonate, PMMA, PET or other suitable optical grade polymers, which will be well-known per se to the skilled person such that it suffices to say that any suitable polymer may be used for this purpose.

An important consequence of having an optical stack 200 that is transparent to radio waves is that a module 400 including a wireless receiver for receiving radio frequency signals, e.g. control signals for the at least one light source 100, may be positioned in the path of the conduit 230 behind the optical stack 200, e.g. against the further surface 220, which module 400 may be connected to the at least one light source through one or more wires or cables (not shown) or in a wireless fashion. The wireless receiver may be adapted to receive control signals from a remote control device, which may be a user-controlled remote control device such as a dedicated remote controller or a portable computing device such as a smart phone, personal digital assistant, tablet computer or the like configured to perform as such a remote control device, e.g. by means of an app or the like. Alternatively, the remote control device may be a bridge device of a smart lighting system including the luminaire 10 through which the user control signals are routed to the luminaire 10. Other remote control arrangements of the luminaire 10 will be immediately apparent to the skilled person.

The module 400 additionally or alternatively may comprise one or more sensors to which the luminaire 10 is responsive as well as the one or more drivers for the at least one light source 100 in the luminaire 10. Such sensors for example may be sensors responsive to RF signals such as UV or IR signals, and may be placed behind the optical stack 200 where the optical stack 200 is transparent to such signals. The module 400 additionally or alternatively may comprise a transmitter that is adapted to transmit radio signals to other devices, e.g. other luminaires, within communication range of such a transmitter. The transmitter for example may be used to relay or generate control signals, data, settings or other types of communication to such other devices, as is well-known per se. Where an arrangement comprising multiple luminaires is provided, each luminaire may comprise its own module 400, or one or more of such luminaires may include a module 400 to control a plurality of luminaires, e.g. a cluster of luminaires, in such an arrangement.

The module 400 may form an integral part of the luminaire 10 or may be supplied separate to the luminaire 10. The module 400 may in some embodiments be attached to the further surface 220 or to the frame 700 although this is not necessary; for example, where the luminaire 10 is horizontally mounted, i.e. with the light exit window 211 in a horizontal plane, the module 400 simply may be placed on top of the further surface 220. Alternatively, where the luminaire 10 is vertically mounted, i.e. with the light exit window 211 in a vertical plane, the module 400 may be sandwiched in between the further surface 220 and a mounting surface to which the luminaire 10 is attached or may be supported by a portion of the frame holding the optical stack 200.

The frame holding the optical stack 200 is not particularly limited and any suitable frame may be used for this purpose. For example, as schematically depicted in FIG. 2, the frame 700 may be shaped as a typical photo frame comprising a plurality of linear frame elements 710 each arranged along one of the edges of the optical stack 200, with each linear frame elements 710 terminating in opposing angled surface edges 712 that are angled under a 45° angle with the elongation direction of the linear frame element 710 when the frame 700 is to be used around a rectangular optical stack 200 such that when adjacent frame elements 710 are abutted against each other, i.e. frame elements 710 under a 90° angle with each other along perpendicular edges of the optical stack 200, the slanted or angled surface edges 712 combine to form a closed frame 700 around the optical stack 200.

The respective frame elements 710 may be secured against each other in any suitable manner, such as in a similar fashion as with a photo frame, for example by using screws, clips, brackets or any other suitable type of fastening elements. The frame 700 may be made of any suitable material including materials that block radio waves, such as metals or metal alloys although other materials, e.g. polymer materials, wood, composite materials and so on alternatively may be used.

Figure 2:
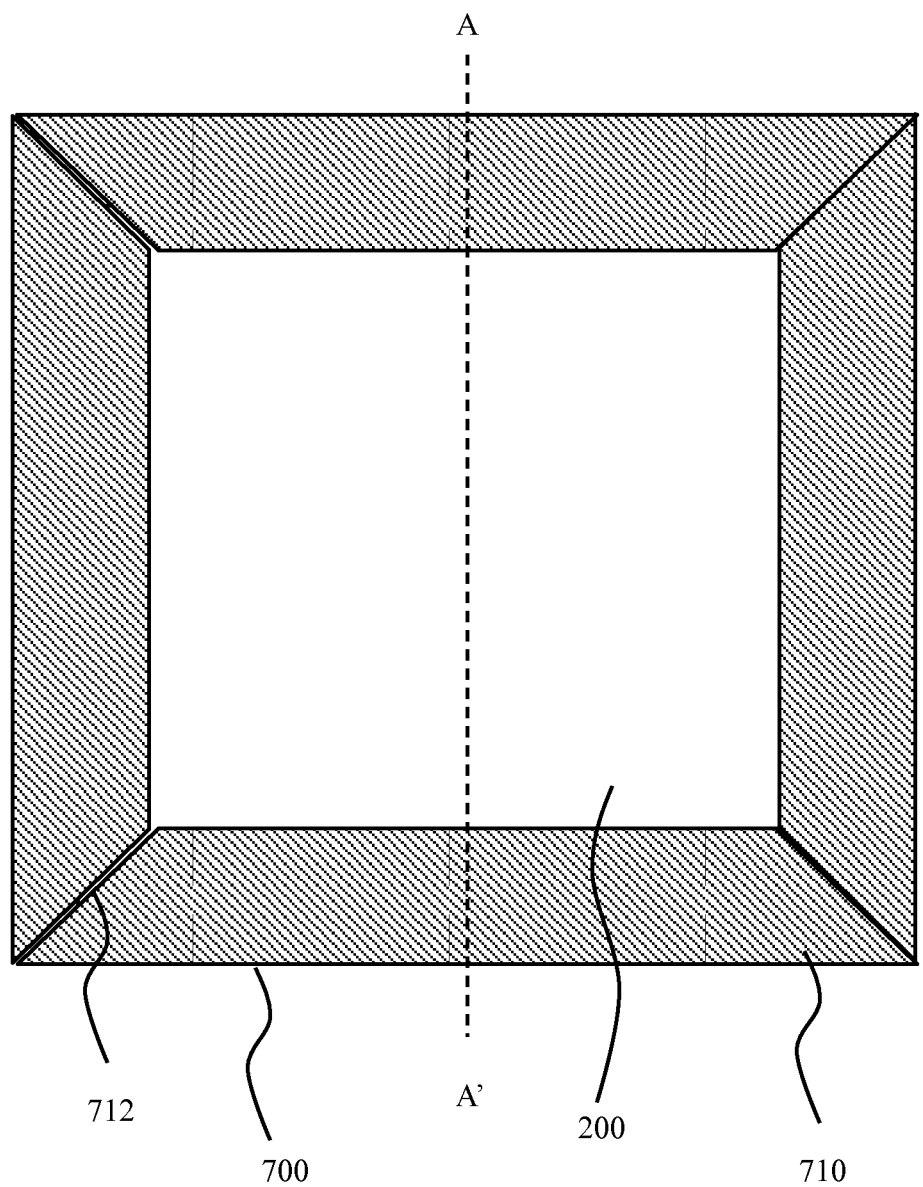
FIG. 2 schematically depicts a front view of a luminaire according to an embodiment.
Figure 3:
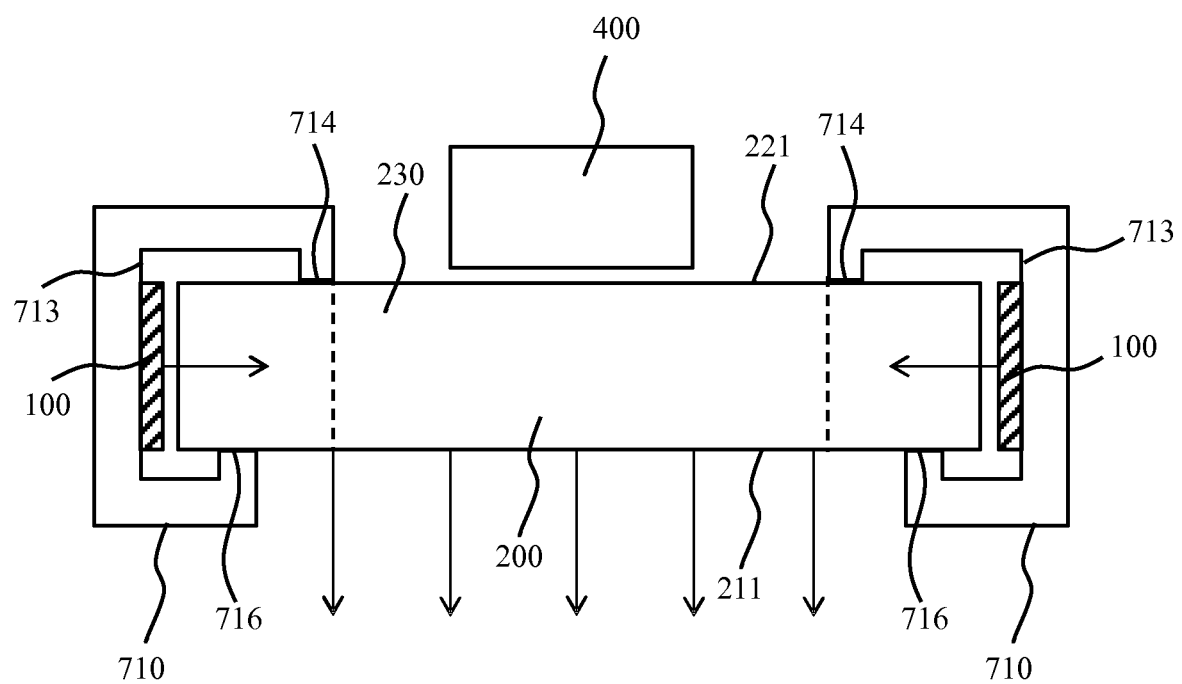
FIG. 3 schematically depicts a cross-sectional view of a luminaire according to an embodiment.

A cross-section of the luminaire 10 of FIG. 2 along the line A-A' is schematically depicted in FIG. 3, in which the cross-sections of two opposing frame elements 710 around the optical stack 200 are visible. The frame elements 710 generally have a U-shaped profile into which the optical stack 200 is pushed, which profile includes an inner surface 713 facing an edge of the optical stack 200. The inner surface 713 carries a light source 100, e.g. a plurality of SSL elements mounted on an adhesive strip adhered to the inner surface 713, which light sources 100 are arranged facing an edge surface 310 of the light guide 300 such that light produced by the light sources 100 is coupled into the light guide 300 and is directed to the light exit window 211 of the optical stack 200 as indicated by the arrows in FIG. 3.

The frame elements 710 may be resilient such that the terminal portions or clamping portions 714 and 716 arranged distally at the U-shaped profile of the frame elements 710 are pushing towards each other when moved apart, e.g. when the optical stack 200 is pushed into the U-shape profile such that the optical stack 200 is secured in the frame 700 by the respective clamping portions 714, 716. However, it should be understood that in alternative embodiments the clamping portions 714, 716 may be omitted from the frame elements 710, e.g. where the U-shape profile of the frame elements 710 provide a tight fit around the optical stack 200. The module 400 as previously described may be positioned behind the luminaire 10, e.g. facing the central region 221 of the further surface 220 or positioned on this central region.

Figure 4:
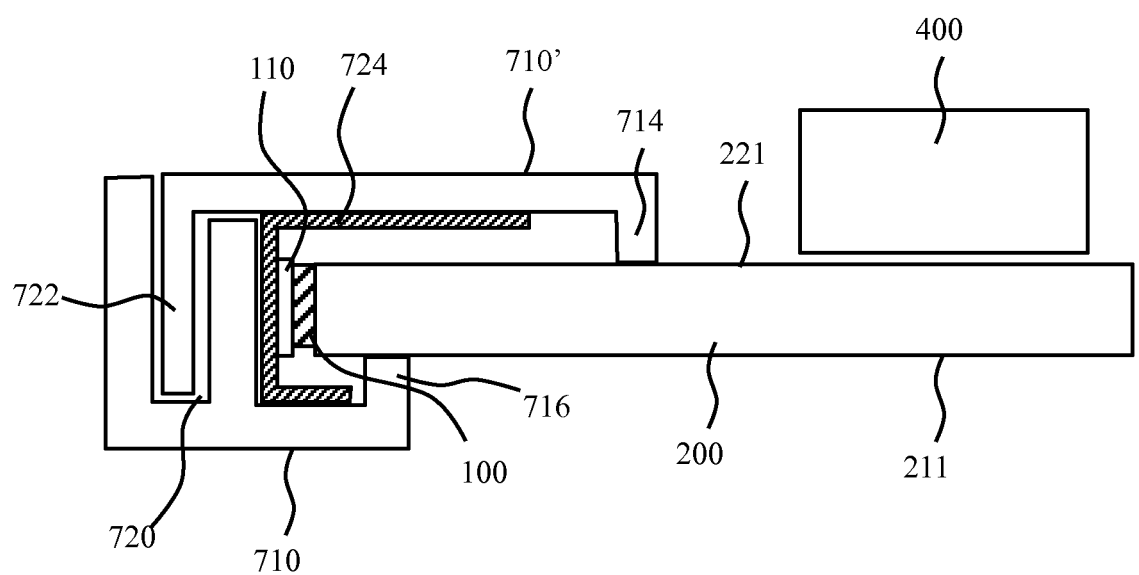
FIG. 4 schematically depicts a cross-sectional view of a luminaire according to another embodiment.

FIG. 4 schematically depicts the cross-section of part of a luminaire 10 according to another example embodiment of the present invention. In this embodiment, the frame 700 comprises a pair of frame elements 710 and 710' that each surround the entirety of the optical stack 200, with the first frame element 710 facing the first surface 210 of the optical stack 200 and the second frame element 710' facing the further surface 220 of the optical stack 200. In this embodiment, the frame elements 710 and 710' may be secured against each other such that the optical stack 200 is sandwiched or clamped in between the secured frame elements 710 and 710'. This for example may be achieved using a tongue and groove fastening mechanism, in which the first frame element 710 comprises a groove or channel 720 into which a tongue or lip 722 of the second frame element 710' can be secured by inserting the tongue or lip 722 into the groove 720.

Such securing may be achieved in any suitable manner as is well-known per se. For example, the groove 720 may comprise a resilient ring or the like through which the tongue 722 is pushed when inserting the tongue 722 into the groove 720. The tongue 722 may carry a protrusion such as a barb or the like that can only pass through the resilient ring in one direction such that this insertion of the tongue 722 into the groove 720 secures the tongue 722 in the groove 720, thereby clamping the first frame element 710 to the second frame element 710', and trapping the optical stack 200 in between the respective frame elements of the frame 700. It is noted for the avoidance of doubt that only one edge of the optical stack 200 is shown in FIG. 4 for the sake of clarity, but it should be understood that such a tongue and groove arrangement may be provided along multiple edges of the optical stack 200, e.g. along each of its edges. Also, it should be understood that it is equally feasible that the first frame element 710 comprises the tongue 722 and the second frame element 710' comprises the groove 720 or that each of the first frame element 710 and the second frame element 710' each comprise one or more tongues and grooves along different edges of the optical stack 200.

As before, the frame 700 may be resilient and include clamping members 714, 716 that are pushed apart when the optical stack 200 is positioned in between first frame element 710 and the second frame element 710' when engaged with each other, such that the clamping members 714, 716 hold the optical stack 200 in place by such a resilient force.

The at least one light source 100 may be positioned on any suitable surface portion of the first frame element 710 or the second frame element 710'. For example, the light source 100 may comprise a plurality of SSL elements mounted on a carrier 110 such as an adhesive strip or the like, which may be adhered to a surface of the groove 720 facing an edge surface 310 of the light guide 300 or alternatively may be adhered to a portion 724 of the second frame element 710' as schematically depicted in FIG. 4. As before, the at least one light source 100 is typically arranged such that its luminous output is coupled into the light guide 300 through one or more of its edge surfaces 310 as previously explained. The module 400 as previously described may be positioned facing or in contact with the central region 221 of the further surface 220 such that radio waves entering the optical stack 200 through the light exit window 211 can exit the optical stack 200 through the central region 221 of the further surface 220, i.e. travel through the conduit 230, thereby reaching the module 400.

In some embodiments, the frame 700 may be dimensioned such that upon mounting the luminaire 10 against a mounting surface, a clearance is formed between the mounting surface and the further surface 220 of the optical stack 200. The module 400 in such a scenario typically is dimensioned such that it fits in this clearance. This for example may be useful where the luminaire 10 is to be mounted against a wall such that the module 400 can be hidden between the luminaire 10 and the wall.

Figure 5:
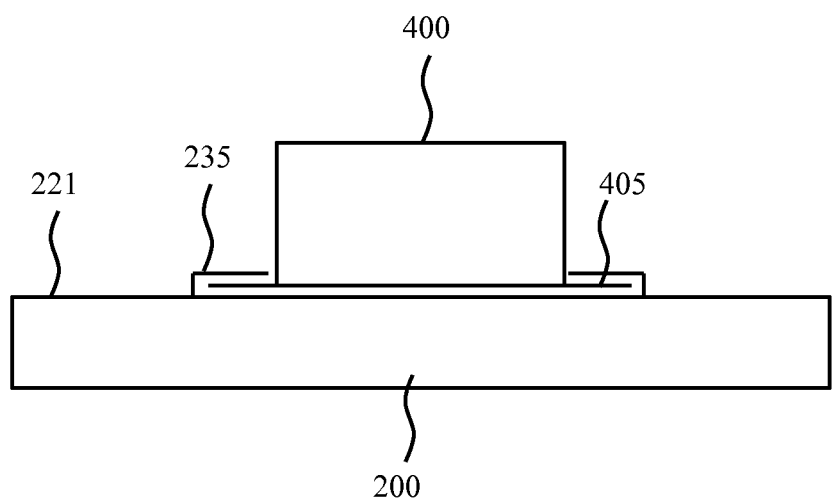
FIG. 5 schematically depicts a cross-sectional view of part of a luminaire according to yet another embodiment.

As previously explained, the module 400 may be placed loosely on the central region 221 of the further surface 220 or alternatively may be supported by a portion of the frame 700, e.g. a bottom portion of the frame 700 in case of a vertically mounted luminaire 10. As a further alternative, the module 400 may be attached to the central region 221 of the further surface 220, for example using an adhesive such as double-sided tape or the like. In some embodiments, the central region 221 of the further surface 220 may comprise a mounting arrangement 235 as schematically depicted in FIG. 5, e.g. an opposing pair of grooves, channels, or the like, into which opposing tongues 405 extending from the module 400 may be positioned, e.g. slid, to secure the module 400 against the optical stack 200.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A luminaire comprising:
   an optical stack transparent to radio waves, the optical stack comprising a first surface including a light exit window and a further surface opposing the first surface, the optical stack including a planar light guide having a first major surface facing or defining the first surface, an opposing second major surface facing or defining the further surface and at least one edge surface extending between said opposing first and second major surfaces; and
   a frame around the optical stack, the frame carrying at least one light source optically coupled to one or more of said edge surfaces of the light guide,
   wherein the frame delimits the light exit window and an exposed portion of the further surface opposing the light exit window, said light exit window and the exposed portion delimiting a conduit for said radio waves through the optical stack,
   wherein the luminaire further comprises a module including at least one component for generating or receiving said radio waves, the at least one component including at least one of a wireless receiver for receiving a control signal for the at least one light source, a sensor and a transmitter for communicating with at least one further device, and
   wherein the module is placed on or attached to the further surface.

2. The luminaire of claim 1, wherein the at least one light source comprises a plurality of solid state lighting elements.

3. The luminaire of claim 1, wherein the optical stack further comprises a planar diffuser on the first major surface of the light guide.

4. The luminaire of claim 1, wherein the optical stack further comprises a planar reflector on the second major surface of the light guide.

5. The luminaire of claim 1, wherein the frame comprises a plurality of frame elements cooperating to form the frame, at least some of said frame elements comprising an elongate surface facing one of said edge surfaces, wherein at least some of the light sources are mounted on said elongate surface.

6. The luminaire of claim 5, wherein the light sources are solid state elements carried by an adhesive strip adhered to the elongate surface.

7. The luminaire of claim 5, wherein each frame element comprises a U-shaped profile in which the optical stack is secured.

8. The luminaire of any of claims claim 5, wherein the plurality of frame elements includes a first frame element including a groove and a second frame element comprising a tongue dimensioned to be secured in said groove.

9. The luminaire of claim 8, wherein said groove comprises said elongate surface.

10. The luminaire of claim 5, wherein the plurality of frame elements are elongate linear elements having terminal surfaces under a 45° angle with the elongation direction of the elongate linear elements, wherein the terminal surfaces of adjacent elongate linear elements abut each other and the plurality of frame elements are secured against each other with fastening members.

11. The luminaire of claim 1, further comprising a driver for the at least one light source.

12. The luminaire of claim 1, wherein the optical stack is made of one or more polymer materials.

13. The luminaire of claim 1, wherein the frame is a metal or polymer frame.

* * * * *